United States Patent [19]

Anderson et al.

[11] Patent Number: 5,754,357
[45] Date of Patent: *May 19, 1998

[54] METHOD AND APPARATUS FOR MOVING A DISK DRIVE ACTUATOR AWAY FROM A MAGNETIC LATCH

[75] Inventors: Todd Barry Anderson; Jeffrey Fred Boigenzahn; John Jeffrey Stephenson; Amy Lisette Warner, all of Rochester, Minn.

[73] Assignee: International Business Machines Corporation, Armonk, N.Y.

[ * ] Notice: The term of this patent shall not extend beyond the expiration date of Pat. No. 5,485,323.

[21] Appl. No.: 463,604

[22] Filed: Jun. 5, 1995

Related U.S. Application Data

[62] Division of Ser. No. 91,856, Jul. 14, 1993, Pat. No. 5,485,323.

[51] Int. Cl.$^6$ ..................................................... G11B 21/02
[52] U.S. Cl. ..................................................... 360/75; 360/105
[58] Field of Search ................................. 360/78.08, 75, 360/72.1, 105

[56] References Cited

U.S. PATENT DOCUMENTS

| | | | |
|---|---|---|---|
| 4,616,277 | 10/1986 | Berti | 360/78.04 |
| 4,755,892 | 7/1988 | Carteau et al. | 360/75 |
| 4,802,033 | 1/1989 | Chi | 360/77.04 |
| 4,881,139 | 11/1989 | Hasebrouck | 360/105 |
| 4,884,152 | 11/1989 | Ide | 360/78.14 |
| 4,890,176 | 12/1989 | Casey et al. | 360/105 |
| 4,903,157 | 2/1990 | Malek | 360/105 |
| 4,985,793 | 1/1991 | Anderson | 360/105 |
| 4,988,893 | 1/1991 | Ogawa | 318/561 |
| 4,989,108 | 1/1991 | Chang | 360/105 |
| 5,003,415 | 3/1991 | Freeze | 360/78.06 |
| 5,023,736 | 6/1991 | Kelsic et al. | 360/105 |
| 5,034,837 | 7/1991 | Schmitz | 360/105 |
| 5,121,260 | 6/1992 | Asakawa et al. | 360/105 |
| 5,315,455 | 5/1994 | Ito | 360/75 |

FOREIGN PATENT DOCUMENTS

| | | |
|---|---|---|
| 53-149012 | 12/1978 | Japan . |
| 60-175292 | 9/1985 | Japan . |
| 2-149986 | 6/1990 | Japan . |
| 777681B | 11/1980 | U.S.S.R. . |

OTHER PUBLICATIONS

Cunningham et al., "Prevention of Hard Errors in Magnetic Files Due to Long Term Degradation", IBM Technical Disclosure Bulletin, vol. 29, No. 10, Mar. 1987, pp.4577–4578.

Kahwaty et al., "Method of Optimizing Multitrack, Magnetic Write Head", IBM Technical Disclosure Bulletin, vol. 32, No. 1, Jun. 1989, pp. 336–337.

*Primary Examiner*—Aristotelis M. Psitos
*Assistant Examiner*—James L. Habermehl
*Attorney, Agent, or Firm*—Homer L. Knearl; Matthew J. Bussan

[57] ABSTRACT

A method and an apparatus for optimizing movement of a disk drive's head actuator arm away from a magnetic latch that holds the arm in a parked position at the Inner Diameter (ID) of a disk. Current energizing of the arm's actuator motor moves the arm away from the magnetic latch and is controlled to compensate for any change in magnetic holding force. When the disk drive is powered up, a current pulse of one polarity is applied to the actuator motor. This initial current pulse normally moves the arm away from the magnetic latch and is followed by a current pulse of the opposite polarity to decelerate movement of the arm. If this initial sequence fails to move the arm away from the magnetic latch, the magnitude of the two current pulses is increased, and the opposite polarity pulse is followed by a small magnitude current of the one polarity. The read signal from the head is monitored to indicate that the arm has moved into the disk's central databand area, and then into the disk's Outer Diameter (OD) area. At this point, the magnitude of current of the one polarity is increased in small steps to gently bring the arm into contact with the disk drive's OD crash stop. The current of the one polarity is then decreased in small steps, and the arm gently moves away from the OD crash stop. The head signal is monitored until the head is positioned at a selected track.

13 Claims, 9 Drawing Sheets

METHOD AND APPARATUS FOR MOVING A DISK DRIVE ACTUATOR AWAY FROM A MAGNETIC LATCH

This is a divisional of application Ser. No. 08/091,856 filed on Jul. 14, 1993, now U.S. Pat. No. 5,485,323.

BACKGROUND OF THE INVENTION

1. Field of the Invention

This invention pertains to the field of magnetic recording using disk drives and, more specifically, to a method and apparatus for energizing the head actuator of a disk drive so as to optimize movement of the actuator away from a magnetic latch.

2. Description of the Prior Art

It is usual practice in the field of magnetic recording using disk drives that when the disk drive is turned off, the disk drive's actuator arm is moved to a non-data area of the disks, and that the arm is parked at this extreme edge of the disks. The art also contains a number of teachings relative to various latch devices that operate to physically hold the actuator arm in this parked position. The following patents, incorporated herein by reference, are exemplary.

U.S. Pat. No. 4,881,139 describes a latch mechanism for a disc drive wherein a ferrous latch arm's position is controlled between two positions by momentary energization of a coil. The respective position of this latch arm operates to latch or to release a head actuator arm. The coil is momentarily energized in one direction to move the latch arm in one direction so as to set the latch, and the coil is momentarily energized in the opposite direction to move the latch arm in the opposite direction so as to release the latch. In both positions of the latch arm, stray magnetic flux from a head arm actuator motor passes through the latch arm.

The present invention provides variable and controlled energization of the actuator motor that operates to move a head actuator arm away from a magnetic latch. The art teaches variable and controlled energization of such a actuator motor for the purpose of compensating for the trackwise disparity that may exist between inductive recording heads and magneto-resistive playback heads. U.S. Pat. No. 4,802,033 is exemplary.

U.S. Pat. No. 5,003,415 is also noted wherein the current delivered to a voice coil of an actuator motor is adjusted so as to balance the environmental forces acting upon the voice coil.

While the above-described devices are generally useful for their intended purposes, the need remains in the art for a method and an apparatus that optimizes movement of a disk drive's head actuator arm away from a parked position whereat the arm is magnetically latched.

SUMMARY OF THE INVENTION

This invention provides a method and an apparatus for optimizing movement of a disk drive's head actuator arm away from a parked position in the presence of a magnetic latch that operates to hold the actuator arm in that position. The invention compensates for any change in the holding force that is provided by the magnetic latch; for example, a change in a permanent magnetic's holding force that may occur over a period of time. Operation of the invention ensures that the actuator arm will be broken away from the force influence of a magnetic latch, and then accurately and optimally brought to a selected position or track relative to a spinning magnetic recording data disk(s).

In embodiments of the invention to be described, and without limitation thereto, the parked position of the head actuator arm is located adjacent to the disk's ID. It has been noted that for various reasons not critical to the invention, the force by which the head actuator arm is held in the parked position by a magnetic latch may vary by as much as plus or minus 20%. When the disk drive is powered up or turned on, it is necessary to move the actuator arm away from this magnetic latch to a preselected disk track or cylinder before data processing may begin; i.e., the position of the actuator arm must be initialized.

An object of the invention is to provide a method and an apparatus for optimizing movement of a disk drive's head actuator arm away from a parked position which is located at an extreme edge of the disk; for example, the ID of the disk. A magnetic latch operates to hold the actuator arm in this parked position. Current energizing of the arm's actuator motor operates to move the arm away from the magnetic latch. The magnitude of the current energization is controlled in accordance with the invention to compensate for any change in magnetic holding force that may occur.

When the disk drive is turned on, a current pulse of one polarity is applied to the actuator motor. This initial current pulse normally succeeds in moving the arm away from the magnetic latch. The initial current pulse is followed by a current pulse of the opposite polarity in order to decelerated movement of the arm away from the magnetic latch. If this initial sequence of two current pulses fails to cause the arm to move away from the magnetic latch, the magnitude of the two current pulses is increased, and it may be desirable that the second opposite polarity pulse be followed by a small magnitude current pulse of said one polarity and of a relatively longer duration. It is also possible that such an increase in current magnitude will not overcome the holding force of the magnetic latch, whereupon the procedure is repeated with yet grater magnitude currents. Of course, should such repetitions cause the current magnitudes to reach a maximum allowable value, a failure to start is indicated.

In any event, the read signal from the head is monitored to indicate that the arm has, in fact, moved into the centrally-located databand area of the disk, toward the disk's OD area. The head signal is now also monitored until the head is positioned at a selected databand track or cylinder; for example, the first cylinder within the databand (sometimes called cylinder 0). The actuator motor is then servo controlled to track follow on this selected track. The disk drive is now ready for data processing operation.

Often the mechanical/electrical construction and arrangement of a disk drive will provide a force bias on the head actuator arm. One type of such a force bias operates to bias the arm toward a central databand area of the disk, usually to a zero force bias position that is located generally in the center of the disk's databand; i.e., when the actuator arm is on either side of this zero force position, the arm is force biased back to the center position.

When the invention is to be used with such a disk drive, it is again desirable that the read signal from the head be monitored to indicate that the arm has, in fact, moved into the centrally located databand area of the disk, toward the disk's OD area. At this point, a magnitude of current of said one polarity is applied to the actuator motor in small increasing steps in order to overcome this force bias, and gently bring the arm into physical contact with the disk drive's OD crash stop. This current of said one polarity is now decreased in small steps. Since the arm is force biased toward the center of the disk when it is at the location of the OD crash stop, the arm now gently moves away from the OD crash stop and toward the center of the disk. The head signal is again monitored until the head is positioned at a selected databand track or cylinder; for example, the first cylinder within the databand. The actuator motor is then controlled to track follow on this selected track. The disk drive is now ready for data processing operation.

In yet other disk drive construction arrangement, it is possible that the force bias on the actuator arm require that the arm be electrically driven away from the OD crash stop by energization of the actuator motor; i.e., the actuator arm is force biased toward the OD crash stop. When the invention is used with such a disk drive, current pulses of said second polarity are used to energize the actuator motor such that the motor moves the actuator arm away from the OD crash stop, these current pulses operate to overcome the arm's force bias toward the OD crash stop. The head signal is again monitored until the head is positioned at a selected databand track, or cylinder, and the actuator motor is servo controlled to track follow on this selected track. The disk drive is now ready for data processing operation.

Thus, the various embodiments of the invention all operate to gradually increase the magnitude of two abovementioned initial current pulses that are applied to the actuator motor until a signal from the head indicates that the arm has, in fact, moved away from the magnetic latch and into an area of the disk where the arm is no longer under the force influence of the magnetic latch. The current to the actuator motor is then controlled in a variable manner, and in accordance with the mechanical/electrical force bias that is placed on the actuator arm, to track follow at a preselected track, whereupon a good start is indicated.

When the disk drive's construction provides a force bias on the actuator arm, or perhaps when the format of the disk requires the counting of disk cylinders in order to initialize the position of the head at a preselected data track or cylinder, the invention provides for current energization of the actuator motor such that the arm is accurately positioned at this preselected data track.

Other objects and advantages of the invention will be apparent to those of skill in the art upon reference to the following detailed description of the invention, which description makes reference to the drawing.

DETAILED DESCRIPTION OF THE INVENTION

Figure 1:
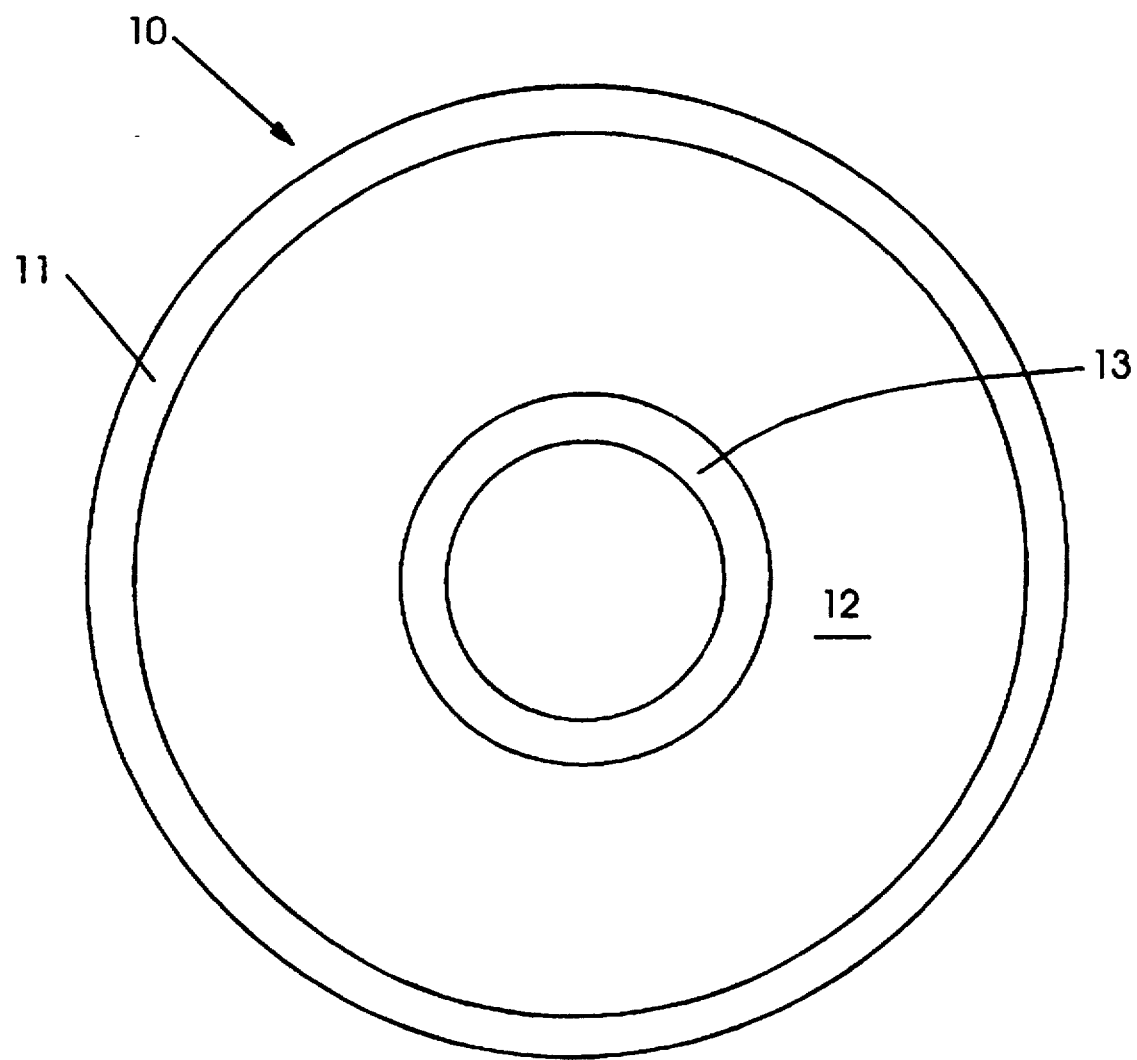
FIG. 1 is a top view of a magnetic recording disk, showing the disk's OD guardband, databand and ID guardband.

This invention pertains to magnetic data storage using disk drives. In conventional disk drives, read/write heads or transducers are mounted on a movable actuator arm. The heads are moved to a desired disk cylinder, or track, by selective control or energization of an actuator motor. The disks are conventionally mounted on a spindle. The spindle is rotated at a substantially constant speed by operation of a spindle motor. The spindle usually supports a number of disks in a stack wherein all similar numbered tracks of the disks lie generally in alignment in what is called a cylinder. In order to control the position of the head actuator and its head(s) relative to a desired track or cylinder, two general types of servo tracking techniques may be provided. In the first type of servoing, one of the disks contains a servo track for each cylinder. In another type of servoing, the individual tracks of each disk contain what is called sector servoing or imbedded servoing. The type of servoing used is not critical to the utility of the invention.

When disk drives of this general type are powered down (i.e., are turned off), it is conventional to move the head actuator arm to a parked or home position, usually near the Inner Diameter (ID) or the Outer Diameter (OD) of the disks, before the disks stop spinning. It is also conventional to provide an ID crash stop and an OD crash stop as a means of physically arresting movement of the actuator arm when the motor for the actuator arm is controlled so as to move the arm to these two extremities of its movement range relative to the disk(s).

In order to ensure that the heads are not inadvertently moved away from this parked position during the disk drive's power-off state, it is conventional to provide a force bias that operates to latch or hold the actuator arm in its parked position. One such home latch provides a magnetic force holding the actuator arm in the parked position. For example, a permanent magnet may be mounted adjacent to the home position, this magnet operating to magnetically attract the actuator arm and hold it in the home position.

Subsequently, when the disk drive is turned on, the disk drive must be initialized, or brought to a state of readiness for data processing, by first moving the actuator arm away from the home latch. The present invention relates to a method and an apparatus for energizing the head actuator motor so as to optimize movement of the actuator arm away from a home latch such as a magnetic home latch.

While the invention is not to be specifically limited thereto, embodiments of the invention provide a magnetic home latch that provides a home, or parked, position for the actuator arm adjacent to the ID of the disk or disk stack. In order to provide controlled movement of the actuator arm away from this home latch, current energizing of the arm's actuator motor compensates for any change in magnetic holding force that may occur.

When the disk drive is turned on, a current pulse of one polarity is applied to the actuator motor. This initial current pulse normally moves the arm away from the magnetic latch. The initial current pulse is followed by a second current pulse of the opposite polarity. This second current pulse decelerates movement of the arm away from the magnetic latch. If this initial sequence of two current pulses fails to cause the arm to move away from the magnetic latch, the magnitude of the two current pulses is increased, and the second opposite polarity pulse is followed by a small magnitude current of said one polarity.

The read signal from the head is monitored, and the actuator motor is then controlled to seek and track follow on a preselected disk track. In this way, the position of the actuator arm and its heads are initialized.

In embodiments of the invention wherein the actuator arm is force biased as a result of the mechanical/electrical construction of the disk drive, and/or when the format of the disk requires the counting of disk tracks in order to initialize the position of the actuator arm, the read signal from the head is monitored to indicate that the arm has moved into the centrally located databand area of the disk and, thereafter, toward the disk's OD. At this point, a current of said one polarity is applied in increasing magnitude small steps in order to gently bring the arm into physical contact with the disk drive's OD crash stop. The current to the actuator motor is now controlled to bring the actuator arm away from the OD crash stop, to a preselected disk track, whereat the position of the actuator arm is initialized.

For example, when the actuator arm is force biased away from the OD crash stop toward the center of the disk, the current of said one polarity is now decreased in small steps. Since the arm is force biased toward the center of the disk, the arm now gently moves away from the OD crash stop and toward center of the disk. The head signal is monitor until the head is positioned at a selected data band track or cylinder, for example cylinder 0. The disk drive is now ready for data processing operation.

FIG. 1 is a top view of such an exemplary magnetic recording disk 10 showing the disk's OD guardband 11, databand 12 and ID guardband 13.

Figure 2:
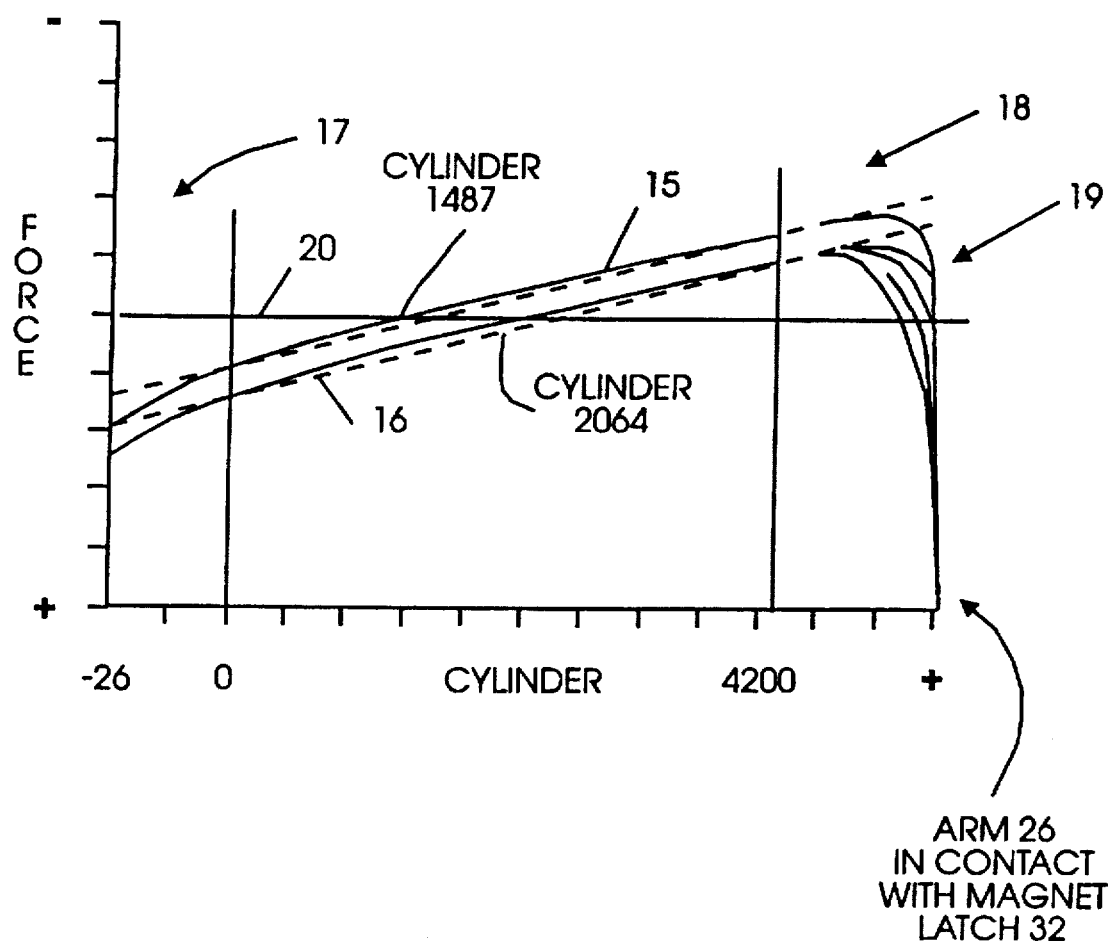
FIG. 2 is a representative force plot showing the bias force that acts on a disk drive's head actuator arm in relation to the cylinder portions of the ID guardband, the databand, and the OD guardband of the magnetic recording disk shown in FIG. 1.

As is well known by those of skill in the art, the construction and arrangement of a disk drive may provide a force bias on the head actuator arm. FIG. 2 is an example wherein this force bias operates to bias the arm toward a central databand area of disk 10 shown in FIG. 1, usually to a zero force bias position that is located generally in the center of the disk's data band. FIG. 2 is a representative force plot of such an arm force biasing condition wherein the horizontal axis of the figure represents the disk cylinders, beginning at cylinder −26 at the disk's OD and ending at cylinder a positive numbered cylinder at the disk's ID. The vertical axis of FIG. 2 represent the + and −force biases on the actuator arm, horizontal axis 20 being a 0 force axis condition. In the convention of FIG. 2, a −force is a force tending to move the actuator arm from the disk's ID toward the center of the databand, whereas a+is a force tending to move the actuator arm from the disk's OD toward the center of the databand.

While the invention is not to be limited thereto, the disk drive's actuator arm has its parked position adjacent to the disk's ID cylinder arbitrarily designated as a positive cylinder. The disk drive's magnetic latch 32 is also located to hold the actuator arm adjacent to this disk cylinder.

In the representative showing of FIG. 2, OD guard band 17 comprises cylinders −26 to 0, and ID guard band 18 comprises cylinders 4200 to a higher numbered positive cylinder. Also, as is well known to those of skill in the art, ID and OD crash stops are provided adjacent to the disk's ID and OD. These crash stops operate to physically arrest movement of the actuator arm when the arm is driven to these two disk extremes.

The force bias hysteresis force curve plot of FIG. 2 provides a first curve portion 15, called the inbound curve, that demotes the force bias on the actuator arm during movement of the arm from the disk's OD toward the disk's ID. Curve portion 16, called the outbound curve, denotes force bias on the actuator arm during movement of the arm from the disk's ID toward the disk's OD. As seen in FIG. 2, the 0 force position of inbound curve 15 occurs at about cylinder 1487, whereas the 0 force position of outbound curve 16 occurs at about cylinder 2084.

The portion 19 of FIG. 2 represents the effect of the magnetic latch that is positioned to provide a parked position for the heads adjacent to the disk's ID. As can be seen, the presence of the magnetic latch causes the arm to no longer be force biased toward the center of the disk's databand and, in fact, the arm is force biased away from the center of the disk to a parked position adjacent to the disk's ID.

Operation of the invention overcomes the force represented by curve portion 19, thus causing the actuator arm to move onto curve portion 16. This condition is detected by reading data cylinders in the databand as the arm moves away from the disk's ID. When this condition is detected, small positive polarity current pulses of increasing magnitude are applied to the arm's actuator motor, thus causing the arm to gently move through the databand and the OD guard band until the arm engages the OD crash stop. At this time, the positive polarity current to the actuator motor is reduced in small steps, thus allowing the force bias of curve portion 15 to cause the arm to gently move back into the databand area. Reading of cylinders in the databand enables track following on a designated track within the databand (for example, cylinder 0) whereupon the disk drive has been initialized and data processing may reliably begin.

While an embodiment of the invention is to be described relative to a disk drive having an actuator arm force as is represented by FIG. 2, it is to be noted that the invention is not to be restricted to utility with such a disk drive.

Figure 3:
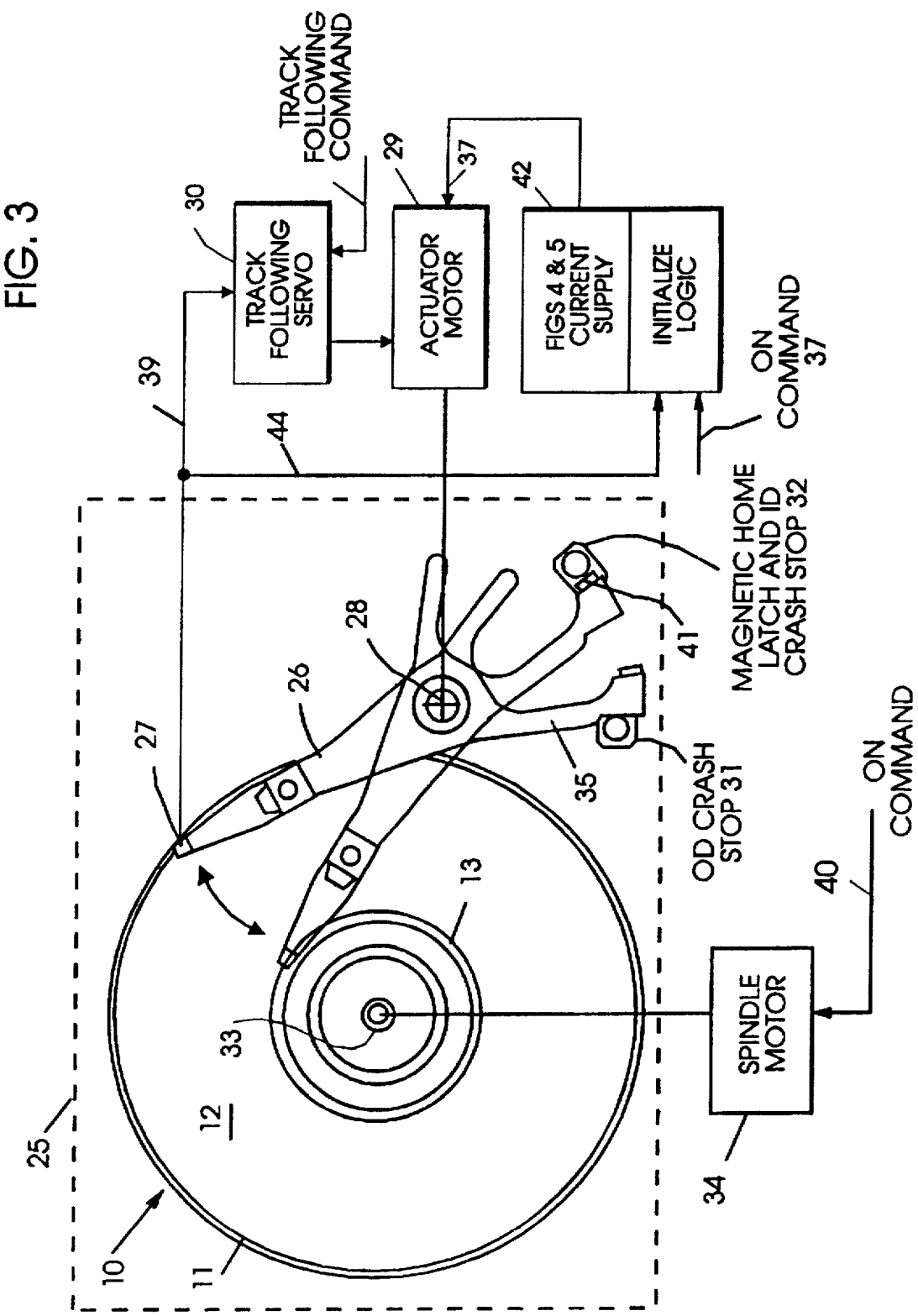
FIG. 3 is a top simplified view of a disk drive, showing a stack of disks mounted to rotate about a spindle axis by operation of a spindle motor, and showing a head actuator arm rotatable about a pivot by operation of an actuator motor, the upper end of the arm carrying read/write heads, and the dotted line position of the arm showing a magnetically permeable portion of the arm engaging a magnetic home latch and ID crash stop.

FIG. 3 is a simplified top view of a disk drive 25 showing a stack of disks 10 that rotate counterclockwise about spindle axis 33 by operation of spindle motor 34. The disk drive's head actuator arm 26 bidirectionally rotates about pivot 28 by operation of actuator motor 29. Arm 26, and the heads 27 carried thereby, are shown in the extreme OD position wherein a portion 35 of arm 26 engages OD crash stop 31. In this state of arm 26, disks 10 are rotating at full operational speed by virtue of an on command that is provided by conductor 40.

While FIG. 3 shows actuator motor 29 as a rotary actuator, the invention is not to be so limited since the invention finds utility with other types of actuator motors, for example voice coil motors.

The dotted line position of actuator arm 26 shows the magnetically permeable portion 35 of arm 26 engaging magnetic home latch and ID crash stop 32. The magnetic latch portion of structure 32 is provided by a permanent magnet 41 that magnetically attracts and force biases the magnetic portion 35 of arm 26 to remain in the dotted line parked position shown for arm 26 (also see curve portion 19 of FIG. 2). While FIG. 3 shows the magnetic latch and the ID crash stop integrated into a single physical structure in accordance with the invention, these two functions can be provided by two separate physical structures.

The dotted line showing of actuator arm 26 shows the heads 27 carried by arm 26 in their home or parked position adjacent to the disk's ID. In this state of arm 26, disks 10 may, for example, be stationary and disk drive 25 is powered off.

In accordance with the invention, on power up of disk drive 25, by the presence of an on command on conductors 40 and 37, the position of arm 26 and its heads 27 is initialized by control of actuator motor 29 by selective current energization of motor 29 as provided by current supply 42 and initialize logic 43. Actuator motor 29 is also controlled by track following servo 30. Servo 30 receives a track command on conductor 38, and is able to cause heads 27 to follow a specified disk track by virtue of the feedback head read signal that is provided to tracking servo 30 by conductor 39.

As stated previously, disk drive 25 may be provided with a number of mechanical/electrical construction and arrangements that are not critical to the basis operation of the invention. That is, actuator arm 26 may not be force biased to any particular position on disk 10, or the format of disk 10 may require the counting of track cylinders in order to initialize the position of actuator arm 26, or the force bias on actuator arm 26 may be as shown in FIG. 2.

First, assuming that the construction and arrangement of disk drive 25 provides a force bias on actuator arm 26 as is shown in FIG. 2, this force bias operates to bias arm 26 toward the central databand area of 12 disk 10, usually to a zero force bias position that is located generally in the center of databand 12.

The dotted line position of actuator arm 26 subjects the arm to the bias force shown as portion 19 of FIG. 2 (i.e., to the force effect of magnetic latch 32) that is positioned to provide the parked position for heads 27 adjacent to the ID of disks 10. The presence of magnetic latch 32 causes arm 26 to no longer be force biased toward the center of databand 12 and, in fact, arm 26 is force biased away from the center of disk 10 to the parked position adjacent to the disk's ID, as is shown by curve portion 19 of FIG. 2.

Figure 4:
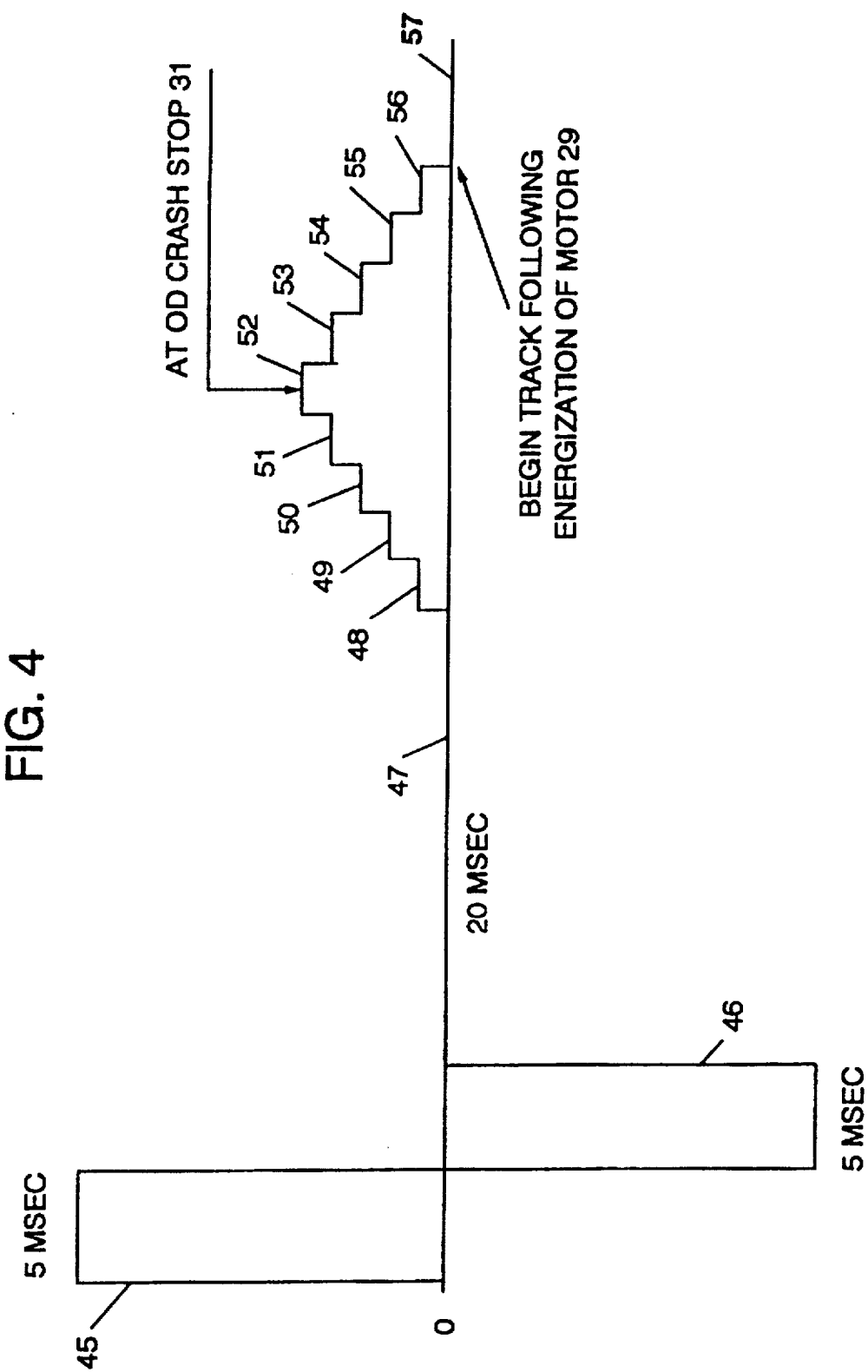
FIG. 4 is a representative current plot for a disk drive having an arm bias as shown in FIG. 2, and showing the current that is applied to the actuator motor of FIG. 3 during a disk drive start initialization that did not require a retry to overcome the force of the magnetic latch shown in FIG. 3.
Figure 5:
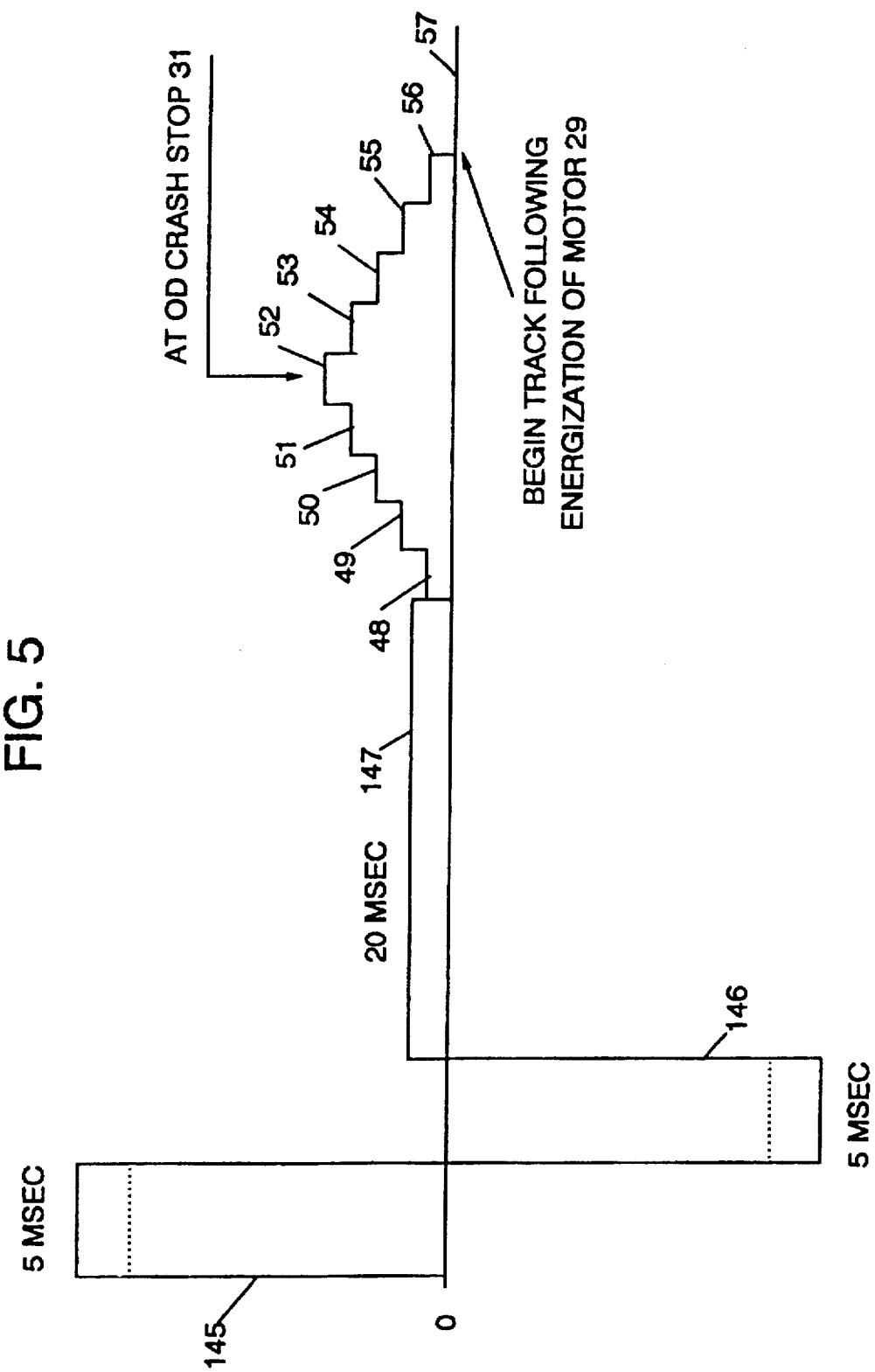
FIG. 5 is a representative current plot for a disk drive having an arm bias as shown in FIG. 2, and showing the current that is applied to the actuator motor of FIG. 3 during a disk drive start initialization that required a retry to overcome the force of the magnetic latch shown in FIG. 3.

FIGS. 4 and 5 are representative current plots showing the current that is applied to actuator motor 29 of FIG. 3 when disk drive 25 is of the type having an arm bias as shown in FIG. 2. FIG. 4 shows a disk drive start initialization current sequence that did not require a retry to overcome the force of magnetic latch 32; i.e., the portion 35 of actuator arm 26 was successfully pulled away from the magnetic force of magnetic latch 32 by this current sequence. FIG. 5 shows a start initialization wherein the first two current pulses 45,46 of FIG. 4 did not succeed in pulling the portion 35 of actuator arm 26 away from (or out of the force influence of) magnetic latch 32 and, therefore, the retry current shown in FIG. 5 was necessary in order to overcome the force of magnetic latch 32.

With reference to FIG. 4, when the disk drive of FIG. 3 is turned on (i.e., when operating electrical power is applied thereto and conductors 37 and 40 of FIG. 3 become active), initialization logic 43 operates to apply a first current pulse 45 to actuator motor 29. The polarity of current pulse 45 has arbitrarily been designated as positive. This polarity of current pulse operates to cause motor 29 to apply a force to arm 26 tending to cause arm 26 to rotate CW from its dotted line position of FIG. 3, and about its pivot 28. In FIG. 4, arm 26 does, in fact, break away from the force influence of magnetic latch 32. While it is not critical to the invention, pulse 45 is of a magnitude of about 350 milliamps and of a time duration of about 5milliseconds.

Pulse 45 is followed by an opposite polarity current pulse 46 of about 350 milliamps that is applied to motor 29. While not critical to the invention, it is desirable that pulse 46 be of generally equal magnitude and time duration to pulse 45. At the time of the application of pulse 46 to motor 29, arm 26 is rotating CW about pivot 28, and arm portion 35 is moving toward OD crash stop 31. The effect of current pulse 46 is to reduce the rate at which arm portion 35 is approaching OD crash stop 31.

Following current pulse 46, a current pulse 47 of zero magnitude, and of a duration of about 20 milliseconds, is applied to motor 29. At the end of this 20 millisecond interval, arm portion 35 is as yet not in contact with OD crash stop 31. In order to ensure that arm portion 35 gently engages OD crash stop 31, a first sequence of increasing magnitude current pulses or steps 48–52 is applied to motor 29. While it is not critical to the invention, pulses 48–52 are of about 175 milliseconds duration and increasing magnitude of about 175 milliamps per step. The effect of current pulses 48–52 is to overcome the force bias on arm 26 (see FIG. 2) and, thus, cause arm portion 35 to gently engage OD crash stop 31. At the time of current pulse 52, arm 26 has engaged OD crash stop 31.

A second sequence of decreasing magnitude current pulses, or steps 53–56, similar in time duration and magnitude to current pulses 51–48, respectively, is now applied to motor 29. The effect of these current pulses is to reduce the force that motor 29 applies to arm 26. As a result, arm 26 now begins to rotate CCW under the influence of the force bias shown in FIG. 2. This movement brings arm 26 into the area of the disk containing readable cylinders or tracks. Head 27 reads these tracks, and provides a signal to track following servo enabling motor 29 to be controlled to follow a preselected track; for example, track 0 of FIG. 2 (see 57 of FIG. 4). Disk drive 25 has now been initialized, and data processing may begin.

FIG. 5 is generally similar to FIG. 4, but shows the current that is applied to actuator motor 29 of FIG. 3 during a disk drive start initialization that required a retry to overcome the force of magnetic latch 32.

In a situation where such a retry is necessary, current pulses 45,46 of FIG. 4 are first applied to motor 29. The assumed result of these current pulses is that arm portion 35 is not pulled away from the force influence of magnetic latch 32. Two exemplary situations may occur. In the first, arm portion 35 never disengages from magnetic latch 32. This event is indicated by initialization logic 43 (FIG. 3) failing to detect a read signal from head 27. In a second exemplary situation, arm 26 begins to move CW, but after a small amount of CW rotation, arm 26 stops and begins to rotate CCW under the force influence of magnetic latch 32. This event is indicated, for example, by initialization logic 43 first detecting that head 27 has moved into the disk's databand area 12 (FIG. 1), followed by logic 43 detecting that head 27 has reentered ID guardband 13.

When either of these events occur, the retry current sequence of FIG. 5 is implemented by logic 43. Initialization logic 43 now operates to apply a first current pulse 145 to actuator motor 29. The polarity of current pulse 145 is again positive. The magnitude of current pulse 145 is about 12 milliamps greater than the magnitude of pulse 45. It will be assumed in FIG. 5 that arm 26 does, in fact, breakaway from the force influence of magnetic latch 32.

Pulse 145 is now followed by an opposite polarity current pulse 146 that is applied to motor 29. Again, it is desirable, but not critical, that pulse 146 be of equal magnitude and time duration to pulse 145. At the time of the application of pulse 146 to motor 29, arm 26 is rotating CW about pivot 28, and arm portion 35 is moving toward OD crash stop 31. The effect of current pulse 146 is to reduce the rate at which arm portion 35 is approaching OD crash stop 31.

Following current pulse 146, a current pulse 147 of about 12 milliamps magnitude, and of a duration of about 20 milliseconds, is applied to motor 29. At the end of this 20 millisecond interval, arm portion 35 is as yet not in contact with OD crash stop 31.

Since it is assumed that arm 26 was successfully broken away from magnetic latch 32 by current pulses 145,146,147, current pulses 48–56 are again applied to motor 29 to achieve the above-described effect of first engaging OD crash stop 31, and then reversing the direction of arm rotation. At the portion 57 of FIG. 5, the position of arm 26 and heads 27 has again been successfully initialized.

FIG. 5, as above described, is a first retry after failure of the FIG. 4 current waveform to break arm 26 away from the force influence of magnetic latch 32. If the current waveform of FIG. 5 also fails to break arm 26 away from magnetic latch 32, then yet another retry will be made wherein the magnitude of current pulses 145,146,147 are all increased. Should such multiple retries fail to break arm 26 away from the influence of magnetic latch 32, and should the increase in magnitude of the various current pulses reach a maximum value as a result of multiple retries, then logic 43 will operate to signal failure to start disk drive 25 as a result of the occurrence of a power on command 37,40.

Figure 6:
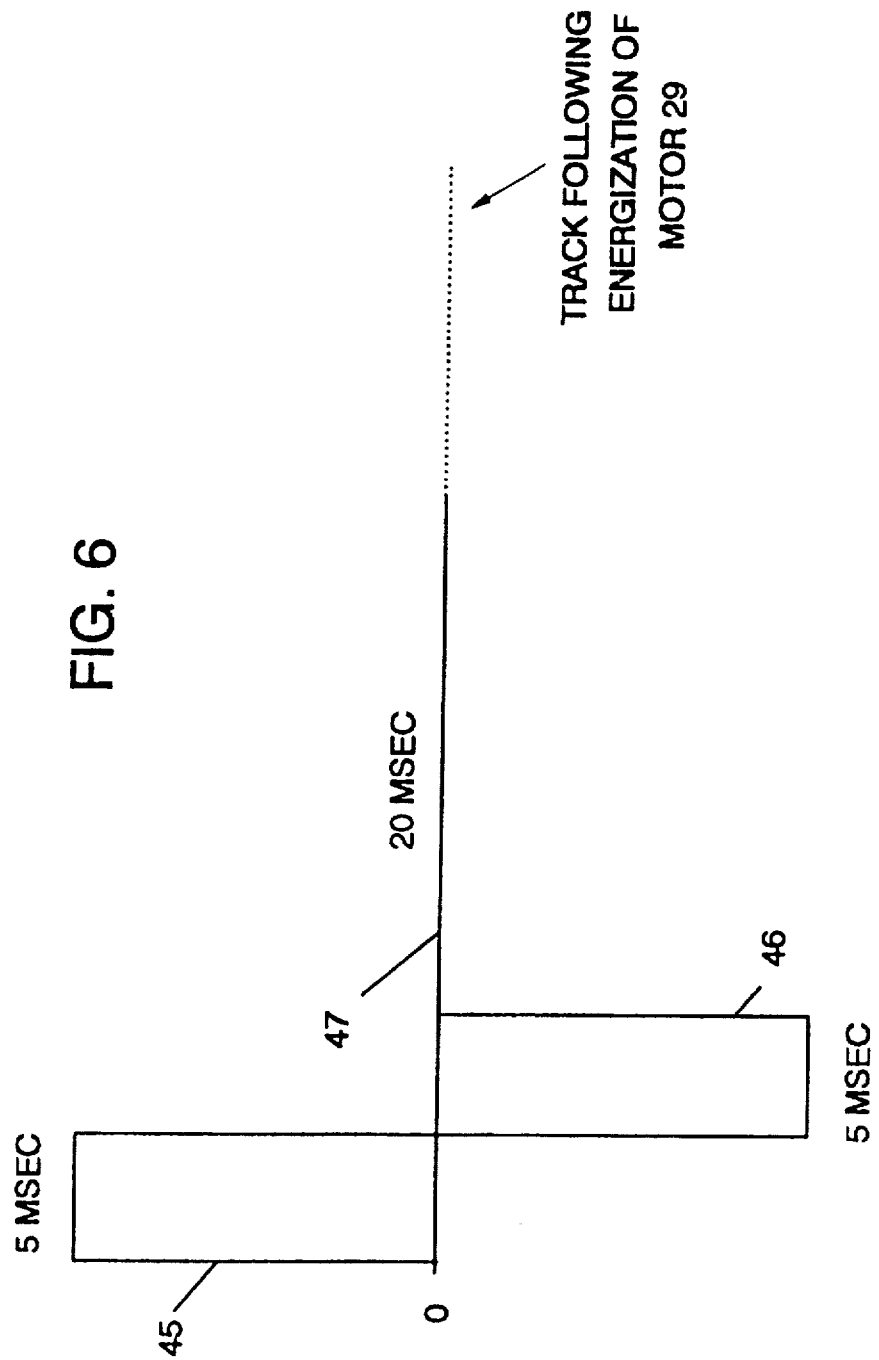
FIG. 6 is a representative current plot for a disk drive whose arm is not force biased as shown in FIG. 2, and showing the current that as applied to the actuator motor of FIG. 3 during a disk drive start initialization that did not require a retry to overcome the force of the magnetic latch shown in FIG. 3.

FIG. 6 is a representative current plot similar to FIG. 4, but for a disk drive 25 whose arm 26 is not force biased by the mechanical/electrical construction of the disk drive. When the invention is used with such a disk drive, the current pulse sequence 48–56 of FIGS. 4 and 5 is generally not necessary. As a result, the successful start, as shown in FIG. 6, results in track following by actuator motor 29 generally after the end of zero magnitude current pulse 47.

Figure 7:
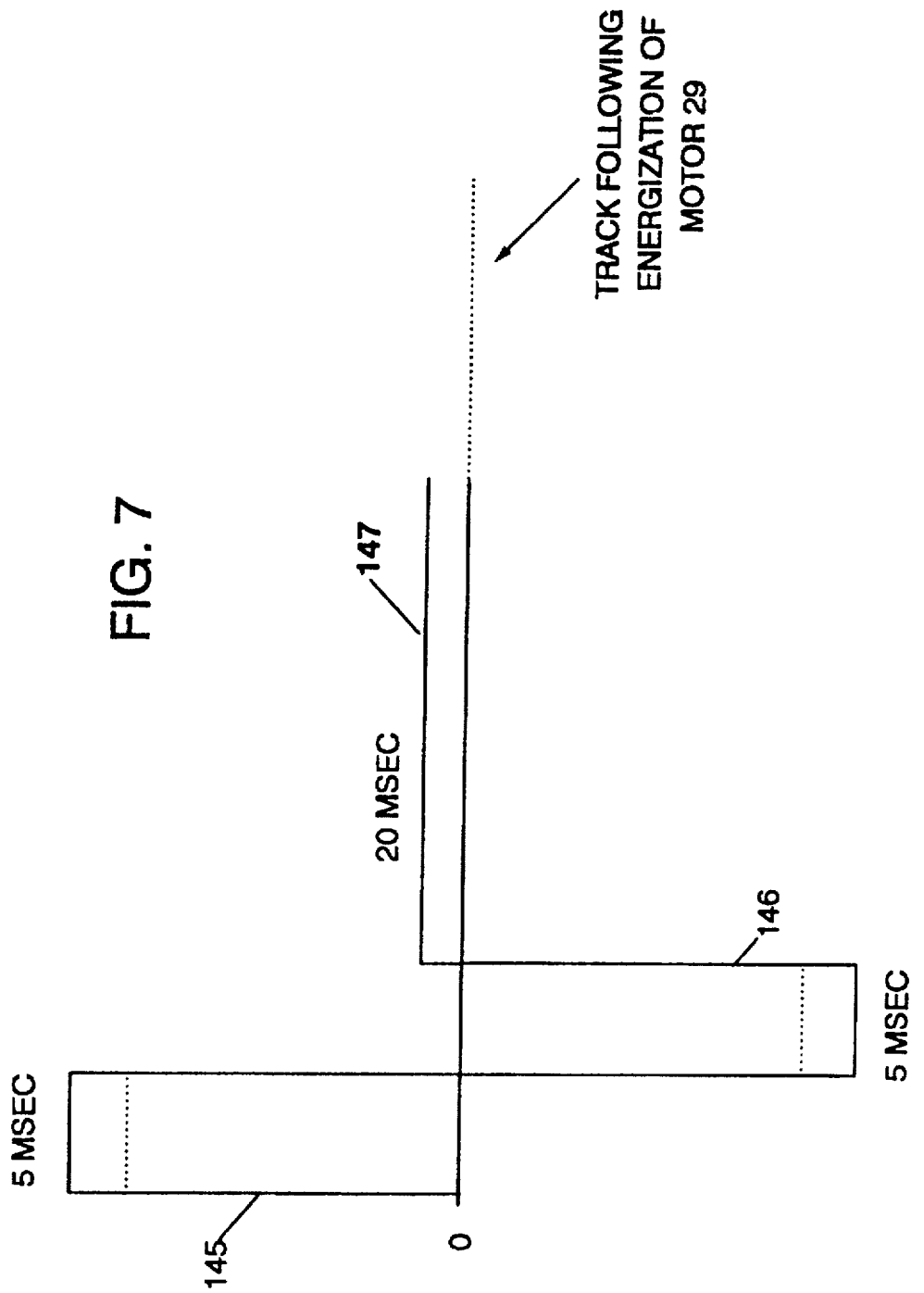
FIG. 7 is a representative current plot for a disk drive whose arm is not force biased, and showing the current that is applied to the actuator motor of FIG. 3 during a disk drive start initialization that required a retry to overcome the force of the magnetic latch shown in FIG. 3.

FIG. 7 is a representative current plot for such a disk drive 25 when the FIG. 6 energization of motor 29 has failed to move arm portion 35 out of the force influence of magnetic latch 32. As a result, the retry current waveform 145,146,147 is applied to motor 29. Assuming that the start is successful, track following by actuator motor 29 begins generally after the end of zero magnitude current pulse 47. Should multiple retries be required, and should current magnitudes reach maximum allowable values, then logic 43 will again signal failure to successfully start after receiving an on command 37,40.

As previously stated, an exemplary disk drive 25 with which the invention finds utility contains a disk 10 whose format requires the counting of disk tracks or cylinders in order to initialize the position of arm 26 and head 27 when a power-on event 37,40 occurs. In such a disk drive 25, the current waveforms of FIGS. 6 and 7 would include additional current waveforms after current pulses 47,147 in order to gently move arm 26 CW to OD crash stop 31. Motor 29 is now controlled to move arm 26 CCW into databand 12 (see FIG. 1), where track following begins. This is followed by one track or cylinder seeks, as arm 26 moves CW back to OD guardband 11. Arm 26 is now controlled to move CCW, and to again do one cylinder seeks. As arm 26 moves CCW, the tracks are counted, and the position of arm 26 and head 27 is initialized at a predefined cylinder (for example, cylinder 0 of FIG. 2).

Figure 8:
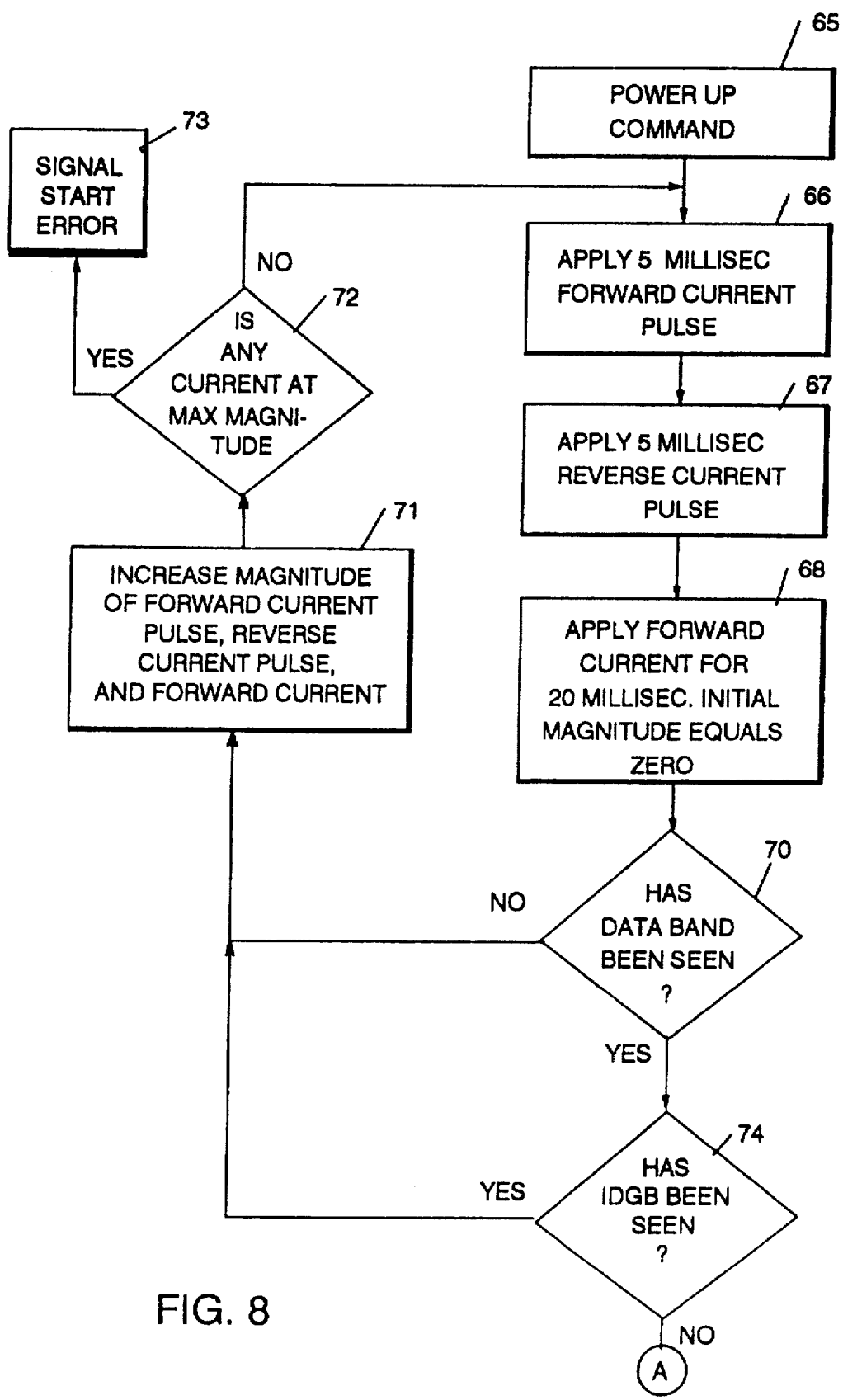
FIG. 8 is a flow chart showing the functions performed by the initialization logic of FIG. 3 in order to implement the current waveform shown in FIGS. 6 and 7.

FIG. 8 is a flowchart showing the functions that are performed by initialization logic 43 of FIG. 3 in order to implement the current waveform shown in FIGS. 6 and 7. The logic functions of FIG. 8 are started by the occurrence of an on command at conductor 37, see logic function 65 of FIG. 8. Event 65 causes 5 millisecond forward current pulse 45 to be applied to actuator motor 29, as is shown at function box 66. This event is followed in time sequence by logic functions 67 and 68 (i.e., the application of second 5 millisecond reveres current pulse to motor 29), and the application of a third 20 millisecond forward current pulse 47 to motor 29 (the magnitude of initial current pulse 47 being zero).

This first application of the three current pulses 45,46,47 to motor 29 may, or may not, break arm 26 away from magnetic latch 32. As will be appreciated by those of skill in the art, a number of known means may be provided to detect successful movement of arm 26 away from the magnetic force influence of magnetic latch 32. A preferred means is for initialization logic 43 to monitor the read signal being supplied by head 27. This signal is monitored at least during and after the time of occurrence of current pulse 47. This signal monitoring is implemented in FIG. 3 by conductor 44 which supplies a read signal from head 27 to logic 43.

It will be first assumed that the three initial current pulses 45,46,47 of FIG. 6 are successful. In this event, track following energization of motor 29 begins soon after current pulse 47. The manner of track following is well known to those of skill in the art, and is not critical to the invention. It suffices to say that arm 26 and head 27 are positioned at a preselected track, and a good start is signaled, whereupon data processing may begin using disk drive 25.

It is now assumed that the three initial current pulses 45,46,47 of FIG. 6 were not successful. Logic function 70 of FIG. 8 must now be implemented. Logic function 70 is implemented by reading the signal from head 27 to determine if head 27 has moved into databand 12 of disk 10. If the head has not moved into databand 12, the no output of logic function 70 causes logic function 71 to be implemented; i.e., the magnitude of forward current pulse 45 is increased, as shown at 145, the magnitude of reveres current pulse 46 is increased as shown at 146, and the magnitude of forward current pulse 47 is increased as shown at 147. Logic function now 72 tests to determine if any of these three current pulses are at a predefined maximum value. If a maximum has been reached, the disk drive start is aborted, and a start error signal is generated to the using data processing system by the operation of logic function 73. If logic function 72 provides a no output, then logic functions 66,67,68 are repeated as shown in FIG. 7.

Logic function 74 of FIG. 8 is implemented when the initial three current pulses 45,46,47 (or a subsequent three current pulses, such as 145,146,147) have, in fact, been successful in pulling arm 26 physically away from magnetic latch 32. As shown in FIG. 8, logic function 74 is enabled by a yes output from logic function 70; i.e., head 27 has, in fact, read signals from the disk's databand 12. Even though arm 26 has been broken away from magnetic latch 32, logic function 74 monitors the signal from head 27 to ensure that the magnetic force of latch 32 has not succeeded in reversing the direction of movement of arm 26, thereby causing arm 26 to return to the disk's ID guard band 11. When event 74 is detected, the yes output of logic function 74 implements the retry logic functions 71,72,73, as above described. A no output from logic function 74 causes a good start to be indicated. Track following at a preselected disk track is implemented.

Figure 9:
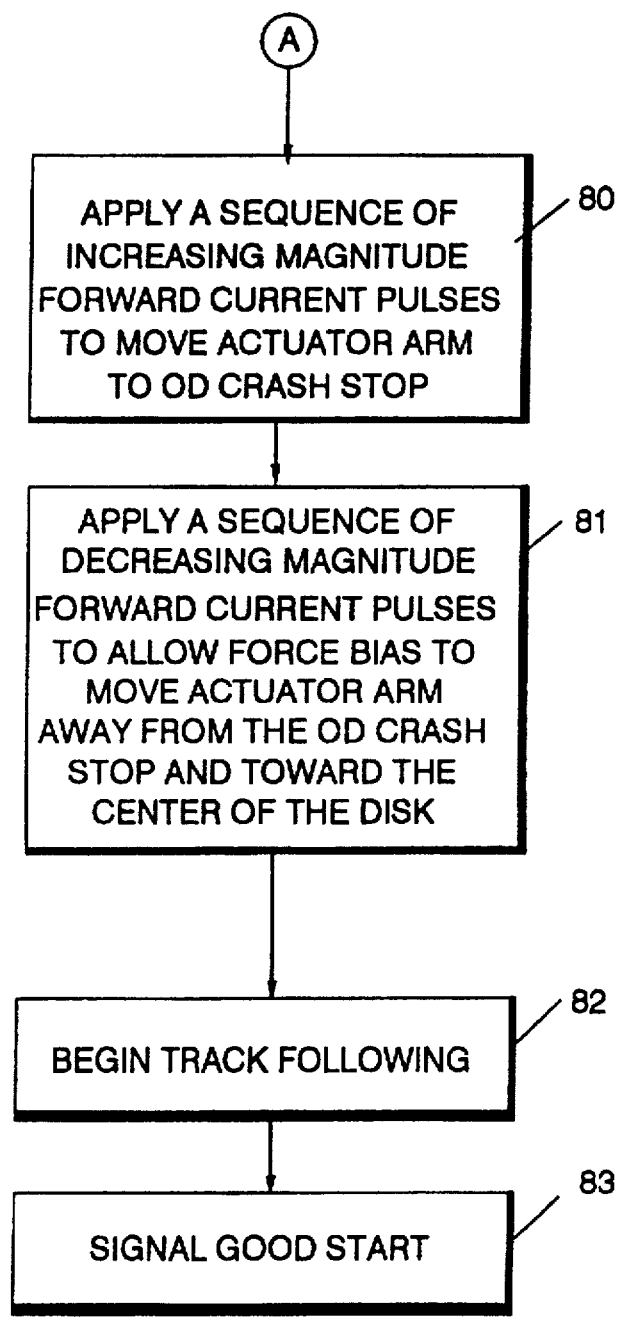
FIG. 9 is a flow chart showing the functions performed by the initialization logic of FIG. 3 in order to implement the sequence of increasing magnitude and decreasing magnitude forward current steps shown in FIGS. 4 and 5.

FIG. 9 is a flowchart showing the functions performed by initialization logic 43 of FIG. 3 in order to implement the sequence of increasing magnitude and decreasing magnitude forward current steps 48–57, as shown in FIGS. 4 and 5. As stated previously, the invention finds utility with a variety of disk drives. In one form of disk drive arm 26 is force biased from both the disk's ID and OD toward the center of the disk, as is shown in FIG. 2. In this event, it is generally desirable to provide the current waveform shown in FIGS. 4 and 5. The initial portion 45,46,47 of FIG. 4 and the initial portion 145,146,147 of FIG. 5 are implemented by the logic functions above-described relative to FIG. 8. However, in FIGS. 4 and 5, a sequence of increasing magnitude and decreasing magnitude forward current pulses 48–57 is provided.

With reference to FIG. 9, when such a sequence of current steps is to be provided, the no output of logic function 74 of FIG. 74 implements logic function 80 of FIG. 9, i.e., the sequence of increasing magnitude forward current pulses 48–52 is applied to motor 29 to thereby cause arm 26 to be gently moved to the disk drive's OD crash stop 31. After the occurrence of current pulse 52, logic 43 operates to implement function 81, and to thereby apply the sequence of decreasing magnitude forward current pulses 53–56 to motor 29, thus causing the force bias on arm 26 to gently move arm 26 away from OD crash stop 31 toward the center of disk 10. During this movement of arm 26, track following begins at a preselected track of disk 10, as shown by function 82, and a good start is indicated as at 83.

It is also within the scope of the invention to provide initialization logic 43 which first applies a sequence of increasing magnitude forward current pulses 48–52 to motor 29 to thereby cause arm 26 to be gently moved to the disk drive's OD crash stop 31, followed by a sequence of decreasing magnitude reverse current pulses 48–52 to motor 29 to thereby cause arm 26 to be gently moved by operation of motor 29 toward the center of disk 10, followed by track following at a preselected disk track.

While invention has been described while making detailed reference to preferred embodiments thereof, it is appreciated that those of skill in the art will readily visualize yet other embodiments that are within the spirit and scope of the invention. Thus, it is intended that the spirit and scope of the invention not be limited by this detailed description.

What is claimed is:

1. A method for moving a head actuator arm of a disk drive away from a home position magnetic latch, said disk drive including a disk having a plurality of tracks that are readable by a head that is carried by said actuator arm, said method comprising the steps of:

(A) detecting a power on condition of said disk drive, (B) applying a current to an actuator motor for said actuator arm, said current being of a first sense that is normally operable to move said actuator arm in a first direction away from said magnetic latch, (C) applying a current of a sense opposite to said first sense to said actuator motor to decrease the rate at which said actuator arm moves in said first direction away from said magnetic latch, (D) responding to a signal from said head to determine when said actuator arm has in fact moved away from said magnetic latch, (E) determining if said current of said first sense has failed to move said actuator arm away from said magnetic latch, and upon detecting such a failure, increasing said current of said first sense until said head signal indicates that said actuator arm has in fact moved away from said magnetic latch, and (F) controlling the current applied to said actuator motor so as to cause said actuator arm to stop moving with said head positioned at a selected track area of said disk.

2. The method of claim 1 wherein step F includes the substeps of:

(F1) applying a current of said first sense to said actuator motor until said actuator arm has moved in said first direction an amount to physically engage a stop that limits movement of said actuator arm in said first direction, and (F2) applying a current to said actuator motor after substep F1, to allow said actuator arm to move in a second direction opposite to said first direction and away from said crash stop.

3. The method of claim 2 wherein said current of said first sense and said current of said opposite sense are current pulses.

4. The method of claim 3 wherein said current pulses of steps B and C are of generally equal time duration.

5. The method of claim 4 wherein said current pulses of steps B and C are of generally equal magnitude.

6. The method of claim 1 wherein said current of said first sense and said current said opposite sense are current pulses.

7. The method of claim 6 wherein said current pulses are of generally equal time duration.

8. The method of claim 7 wherein said current pulses are of generally equal magnitude.

9. In a disk drive having a head, an actuator arm carrying said head, an actuator motor for moving said arm and said head, and a disk having two edge portions and a central portion located intermediate said two edge portions, said disk being arranged in operative relation with said head, and the construction and arrangement of said disk drive providing a bias force that biases said arm away from said the two edge portions of said disk toward said center portion of said disk, a method for optimizing movement of said arm away from a parked position adjacent to one edge portion of said disk, comprising the steps of:

(A) providing a magnetic latch operating to overcome said arm bias force and to magnetically hold said arm in said parked position;

(B) applying a first current pulse of one polarity to said actuator motor, said first current pulse normally causing said arm to move away from said magnetic latch toward another edge portion of said disk;

(C) applying a second current pulse of an opposite polarity to said actuator motor to decelerate movement of said arm away from said magnetic latch;

(D) determining if said first and second current pulses provided by steps B and C has failed to move said arm away from the magnetic force influence of said magnetic latch, and upon detecting such a failure, repeating said steps B and C while increasing the magnitude of said first and second current pulses provided by steps B and C;

(E) determining that said arm has moved out of the magnetic force influence of said magnetic latch by operation of steps B and C; and (F) positioning said arm at a preselected position relative to said center portion of said disk.

10. The method of claim 9 wherein step F includes the substeps of:

(F1) determining when said arm has moved away from said magnetic latch and into the influence of said bias force which tends to move said arm away from said one edge of said disk toward said center portion of said disk, (F2) applying a first sequence of current pulses of said first sense and of increasing magnitude to said motor after substep F1, to overcome said bias force and to cause said arm to move to said another edge portion of said disk, and (F3) applying a second sequence of current pulses of said first sense and of decreasing magnitude to said motor after substep F2, to cause said arm to move away from said another edge portion of said disk and into said center portion of said disk as a result of the influence of said bias force.

11. A disk drive comprising:

a movable actuator arm and head means carried thereby, a disk having a plurality of tracks that are read by said head means, an actuator motor connected to said arm to position said head means at a home position adjacent to an edge of said disk, a home position magnetic latch mounted to force bias said arm to remain at said home position once said arm is moved to said home position by operation of said motor, and initialization logic means operable upon a power on state of said disk drive, and connected to provide current to said motor to move said arm away from said force bias of said magnetic latch, said logic means being constructed and arranged to (A) detect a power on condition of said disk drive, (B) apply a first current pulse to said motor, said first current pulse being of a first sense operable to move said arm in a first direction away from said magnetic latch, (C) apply a second current pulse of a sense opposite to said first sense to said motor to decrease the rate at which said arm moves in said first direction away from said magnetic latch, (D) detect a signal from said head to determine when said arm has moved away from said magnetic latch, and (E) determining if said current of said first sense has failed to move said actuator arm away from said magnetic latch, and upon detecting such a failure, increase said current pulse of said first sense until said head signal indicates that said arm has moved away from said magnetic latch.

12. The disk drive of claim 11 wherein said first and second current pulses are of generally equal amplitudes and time duration.

13. A method for moving a head actuator arm away from a home position magnetic latch that is located adjacent to one edge of a disk, said disk having a plurality of tracks that are located between said one edge and another edge of said disk, said tracks being readable by a head that is carried by said actuator arm, said method comprising the steps of:

(A) detecting a power on condition of said disk drive, (B) applying a current to an actuator motor for said actuator arm, said current being of a first sense that is normally operable to move said actuator arm in a first direction away from said magnetic latch, (C) applying a current of a sense opposite to said first sense to said actuator motor to decrease the rate at which said actuator arm moves in said first direction away from said magnetic latch, (D) responding to a signal from said head to determine when said actuator arm has in fact moved away from said magnetic latch, (E) determining if said current of said first sense has failed to move said actuator arm away from said magnetic latch, and upon detecting such a failure, increasing said current of said first sense until said head signal indicates that said actuator arm has moved away from said magnetic latch, (F) applying a current to said actuator motor to move said actuator arm to said another edge of said disk, (G) controlling said the current to cause said actuator arm to move away from said another edge of said disk, and (H) counting disk tracks during step G and controlling said actuator motor to stop with said head positioned at a selected track of said disk.

* * * * *